(12) United States Patent
Mayer

(10) Patent No.: US 10,617,111 B2
(45) Date of Patent: Apr. 14, 2020

(54) APPARATUS FOR WEEDING A GROUND BY A HIGH-PRESSURE WORKING FLUID

(71) Applicant: Erardo Mateo Mayer, Monza (IT)

(72) Inventor: Erardo Mateo Mayer, Monza (IT)

( * ) Notice: Subject to any disclaimer, the term of this patent is extended or adjusted under 35 U.S.C. 154(b) by 289 days.

(21) Appl. No.: 15/741,028

(22) PCT Filed: Jun. 30, 2016

(86) PCT No.: PCT/IB2016/053937
§ 371 (c)(1),
(2) Date: Dec. 29, 2017

(87) PCT Pub. No.: WO2017/002071
PCT Pub. Date: Jan. 5, 2017

(65) Prior Publication Data
US 2018/0177176 A1     Jun. 28, 2018

(30) Foreign Application Priority Data

Jun. 30, 2015  (IT) .................. 102015000029288

(51) Int. Cl.
*A01M 7/00* (2006.01)
*A01B 39/18* (2006.01)
(Continued)

(52) U.S. Cl.
CPC .......... *A01M 7/0053* (2013.01); *A01B 39/18* (2013.01); *A01M 21/02* (2013.01); *E01H 11/00* (2013.01); *A01G 2003/007* (2013.01)

(58) Field of Classification Search
CPC .. A01M 7/0042; A01M 7/0053; A01M 21/02; A01D 43/14; A01B 39/18; A01G 2003/007; E01H 11/00
See application file for complete search history.

(56) References Cited

U.S. PATENT DOCUMENTS

| 4,926,622 A | * | 5/1990 | McKee | A01D 43/14 56/16.8 |
| 5,101,745 A | * | 4/1992 | Podevels | A01B 45/02 111/115 |

(Continued)

*Primary Examiner* — Ryan A Reis
(74) *Attorney, Agent, or Firm* — Mark David Torche; Patwrite Law

(57) ABSTRACT

An apparatus for the spraying of an area of interest (S) of a high-pressure working fluid (V) wherein the apparatus is susceptible to move relatively to the ground (S) along a direction of reciprocal advancement (d) and it comprises at least one tank (2) for the working fluid (V), at least one outlet nozzle (41) and a fluid connecting line (4) extending from the tank (2) towards the outlet nozzle (41). The apparatus further comprises supply means (5) of the working fluid (V) that include a high-pressure pump and at least one spraying device (10) placed along the fluid connecting line (4) the former (5) upstream with respect to the latter (10). Furthermore, the spraying device (10) comprises a support structure (11) that comprises a first plate (12), motor means (35) acting upon the first plate (12) to promote the eccentric rotation thereof around a first axis (Z) and at least one manifold (42) placed on the first plate (12) to move integrally therewith. In particular, the latter (42) comprises at least one outlet nozzle (41) oriented so as to spray a jet of working fluid (V) towards the ground (S). The first plate (12) is mounted movable with said support structure (11) so that upon the movement along the direction of reciprocal advancement (d) of the apparatus (1) and of the ground (S), the jet flowing from the outlet nozzle (41) hits the latter with helical path.

20 Claims, 8 Drawing Sheets

(51) Int. Cl.
*A01M 21/02* (2006.01)
*A01G 3/00* (2006.01)
*E01H 11/00* (2006.01)

(56) References Cited

U.S. PATENT DOCUMENTS 5,143,131 A * 9/1992 Seigneur ............... B27B 17/025
  144/24.13
5,527,366 A * 6/1996 Mazurkiewicz .... A01M 7/0042
  47/1.5

* cited by examiner

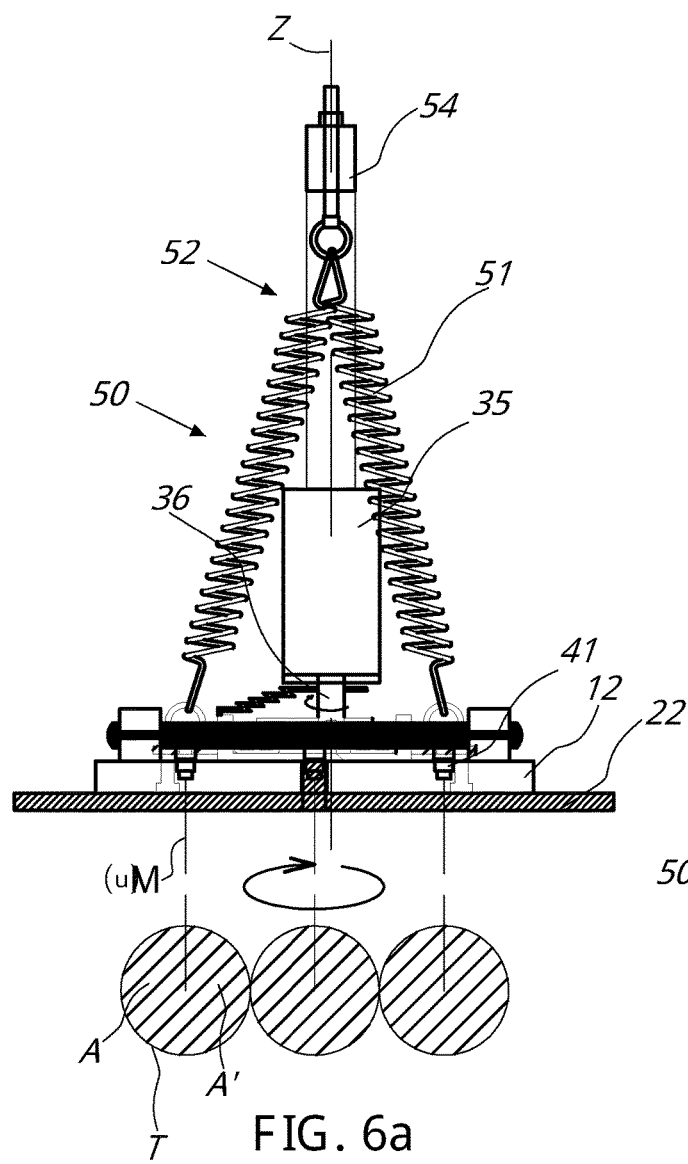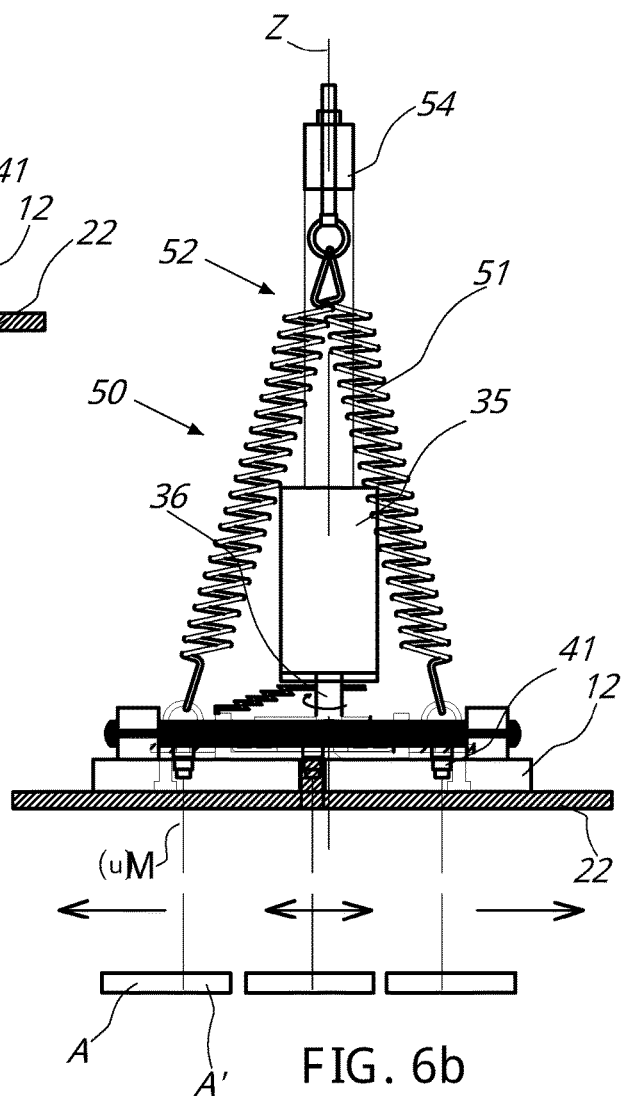
FIG. 6a
FIG. 6b

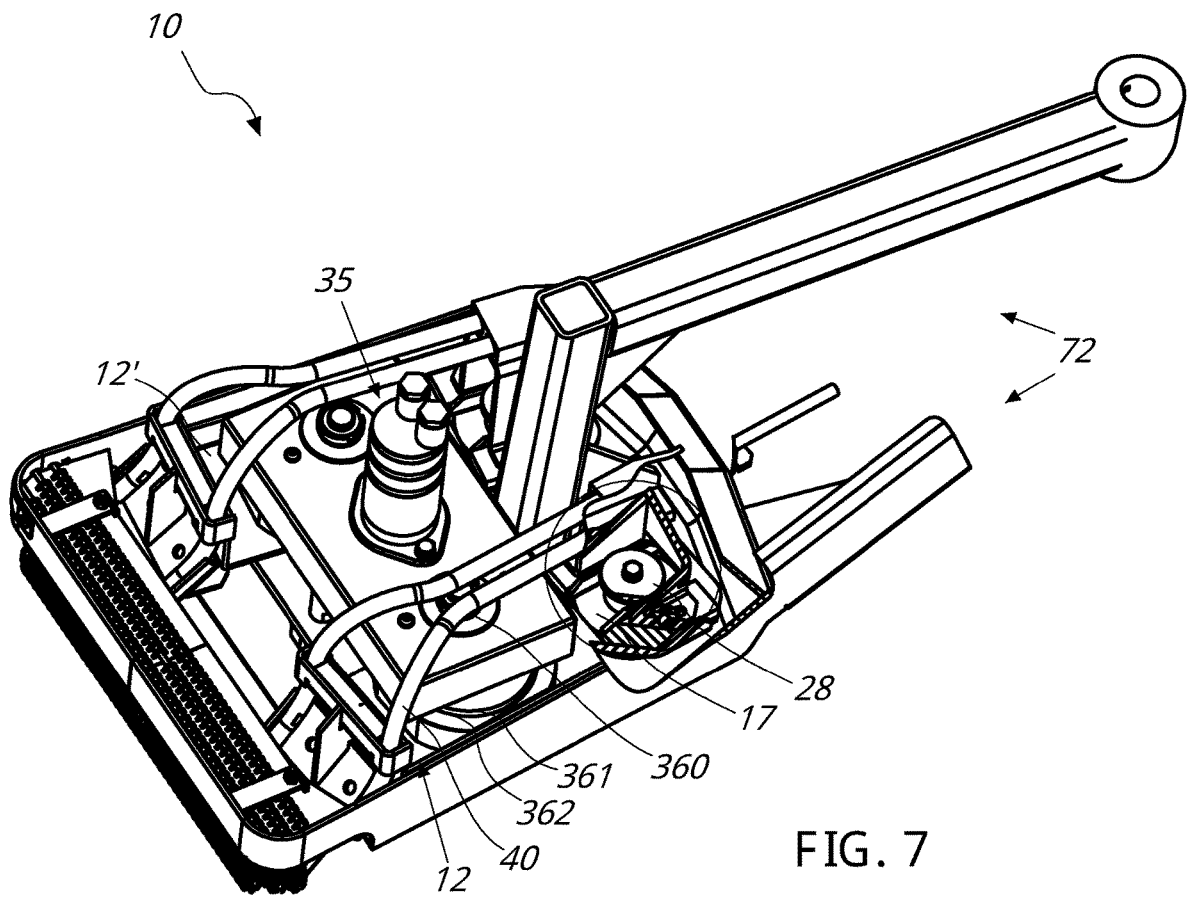
FIG. 7
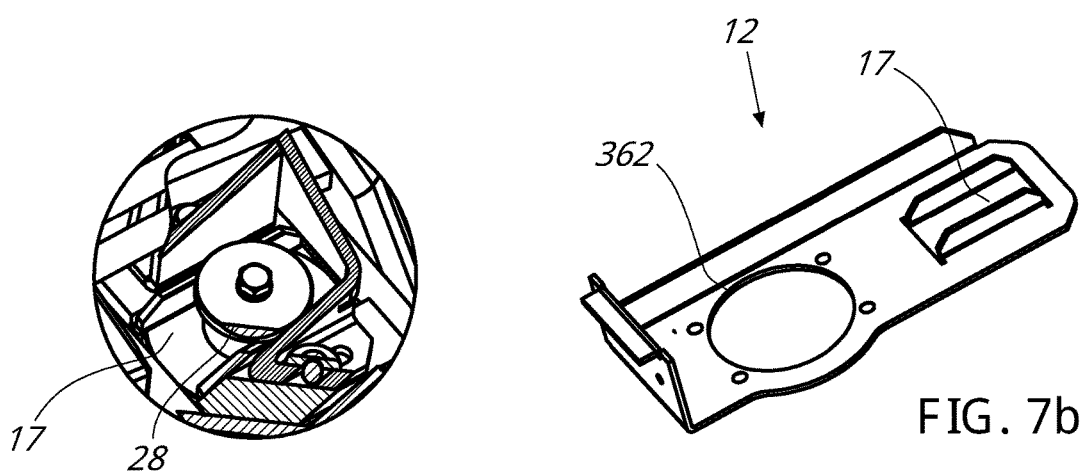
FIG. 7a
FIG. 7b

APPARATUS FOR WEEDING A GROUND BY A HIGH-PRESSURE WORKING FLUID

FIELD OF THE INVENTION

The present invention is generally applicable to the high-pressure plant design field, and it particularly relates to an apparatus for weeding a ground by a high-pressure working fluid, starting from 400 bar.

BACKGROUND OF THE INVENTION

Apparatuses are known that spray a fluid, generally atomized water, towards surfaces.

Such known apparatuses, that are generally transportable and equipped with a lance to facilitate the use by a user, are particularly ineffective if there is the need to spray particularly large surfaces, such as a farmland or a road.

Moreover, such devices have a pressure generally limited to a few bars, definitely not sufficient to perform significant mechanical actions.

SUMMARY OF THE INVENTION

Object of the present invention is to at least partially overcome the above mentioned drawbacks, by providing an apparatus for the weeding of a ground with significant efficiency and relative low cost.

Another object of the invention is to provide an apparatus for the weeding of grounds with different conformation.

Another object of the invention is to provide an apparatus for the weeding of a ground that allows an efficient processing.

Such objects, and others that will appear more evident hereinafter, are fulfilled by an apparatus having one or more of the features herein described, shown and/or claimed.

The appended claims describe advantageous embodiments of the invention.

BRIEF DESCRIPTION OF THE DRAWINGS

Further features and advantages of the invention will become more apparent by reading the detailed description of some preferred but not exclusive embodiments of the invention, shown as non-limitative example with the help of the annexed figures, wherein:

FIGS. 6a and 6b are front views of different embodiments of the device 10;

FIG. 7 is an axonometric view of a different embodiment of the spraying device 10;

FIGS. 7a, 7b, 8 and 10 are views of some enlarged details of the spraying device 10 of FIG. 7;

DETAILED DESCRIPTION OF SOME PREFERRED EMBODIMENTS

Figure 1:
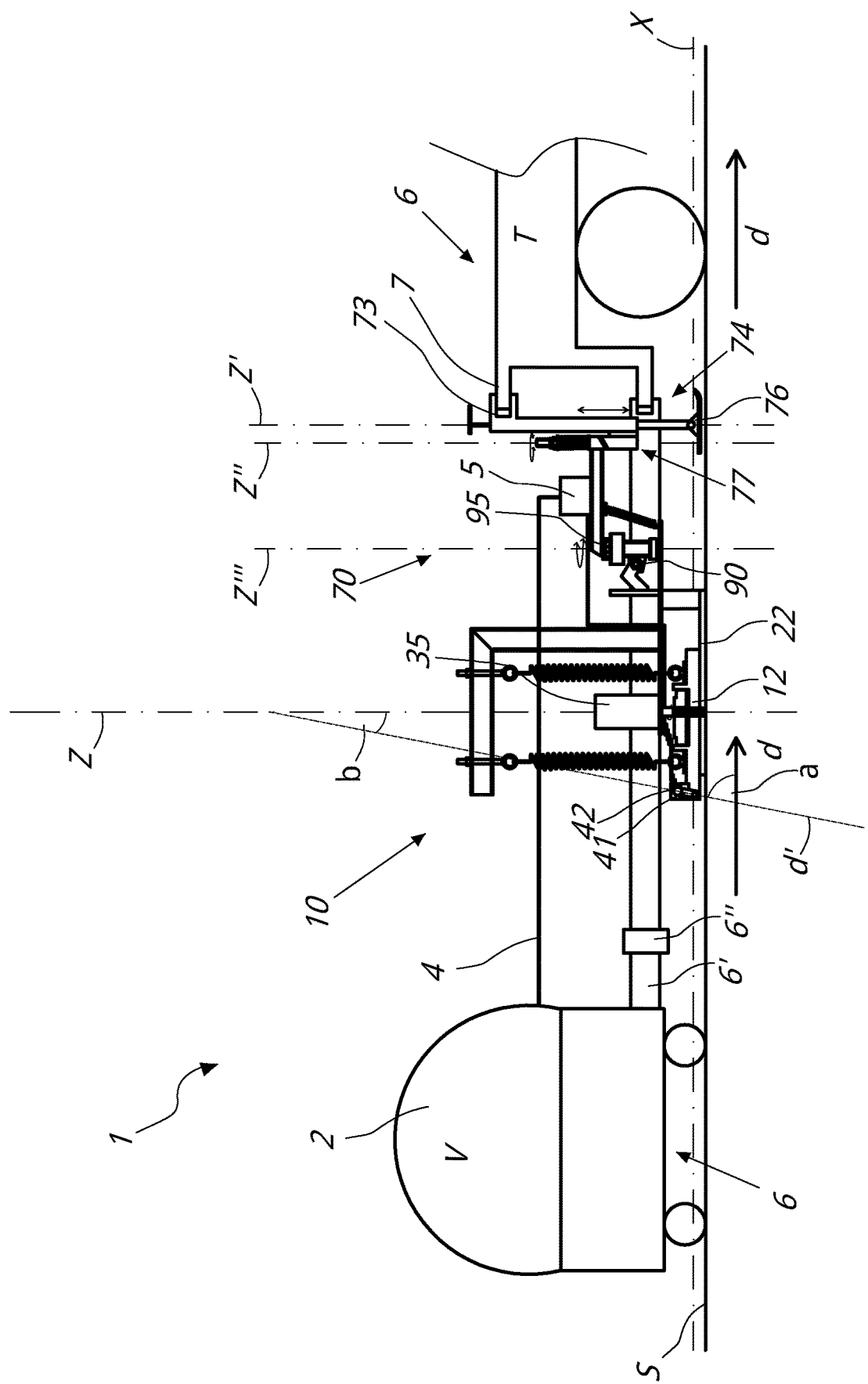
FIG. 1 is a side view of the apparatus for weeding 1.

With reference to the figures, it is described an apparatus 1 for weeding a ground S by a working fluid V, that may consist of, for example, a high-pressure atomized water, starting from 400 bar.

The apparatus 1 may comprise at least one tank 2 for the storage of the working fluid V and suitable supply means 5 thereof such as for example a boiler, a high-pressure pump or a pump-boiler system of a per se known type.

The atomized water V flowing from the apparatus 1 may have a pressure greater than 400 bar, preferably greater than 600 bar and even more preferably greater than 800 bar.

The choice of the pressure depends on the nature and on the solidity of the ground S. In fact, in order to effectively weed the ground thereof, the jet of working fluid must penetrate into the ground for some centimetres, 2-3 centimetres to 10 centimetres depending on the plants to be weeded, in order to cut off the root. In this sense, the operation of weeding according to the present invention may be seen as a high-pressure hydraulic eradication.

For example, in vineyards or orchards generally there is a solid ground and weeds whose roots penetrate into the ground for 2-3 centimetres. In this case, therefore, the working pressure must be adjusted so that the jet penetrates such depth. Generally, in such a case the working pressure may be 500-800 bar.

Certainly, depending on the solidity of the ground and on the nature of the plants to be weeded, such pressure may be higher or lower.

Essentially, the working pressure is given by the choice of the high-pressure pump.

Furthermore, the apparatus 1 may comprise at least one spraying device 10 to spray high-pressure atomized water V towards the ground S. Suitably, a fluid connecting line 4 may then be provided extending from the tank 2 towards the device 10, that may pass through the supply means 5.

According to an aspect of the invention, the apparatus 1 may move forward on the ground S along an advancement direction d. To the object, the apparatus 1 may be integral with and/or mountable on a tractor T or on a agricultural machine or the like.

According to another aspect of the invention, the apparatus 1 may comprise a support frame 6, for example a tubular element or a plate or similar systems, that may be integrally anchored to the tractor T. If necessary, the support frame 6 may comprise one or more portions of the body of the tractor T thereof.

According to a further aspect of the invention, the support frame 6 may comprise a cart or a trailer or the like to be anchored to the tractor T by means of the coupling systems of a per se known type.

Suitably, the tank 2, the supply means 5 and the device 10 may be placed on the tractor T, or on the support frame 6 so as to be integrally anchored to the tractor T thereof.

Moreover, the support frame 6 may comprise an arm 6' that may comprise one or more joints 6". In particular, the joint 6" may be blockable by a user by means of systems of a per se known type, for example by means of a hydraulic or pneumatic system, so that the arm 6' may be selectively rigid or articulated.

Due to such a feature the movement of the apparatus 1 may be facilitated in small spaces.

The device 10 may comprise a support structure 11 having any configuration, that may include one or more outlet nozzles 41 oriented towards the ground S.

The ground S may not be the top surface of a vehicle.

Figures 5A, 5B, 5C:
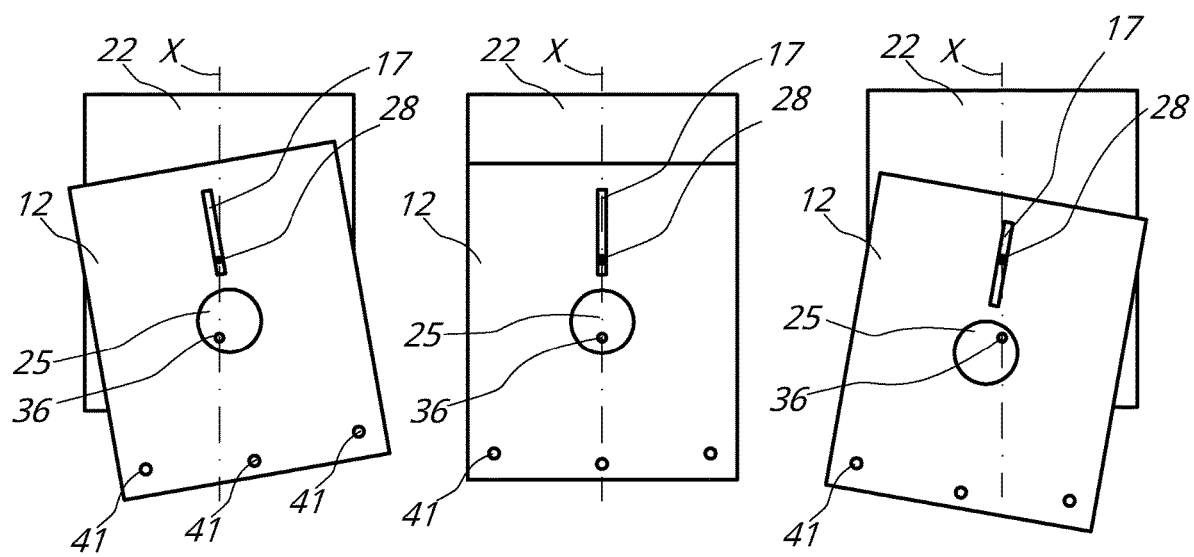
FIGS. 5a to 5c are top views of the detail of the device 10 of FIG. 4 in different operative phases.
Figure 8:
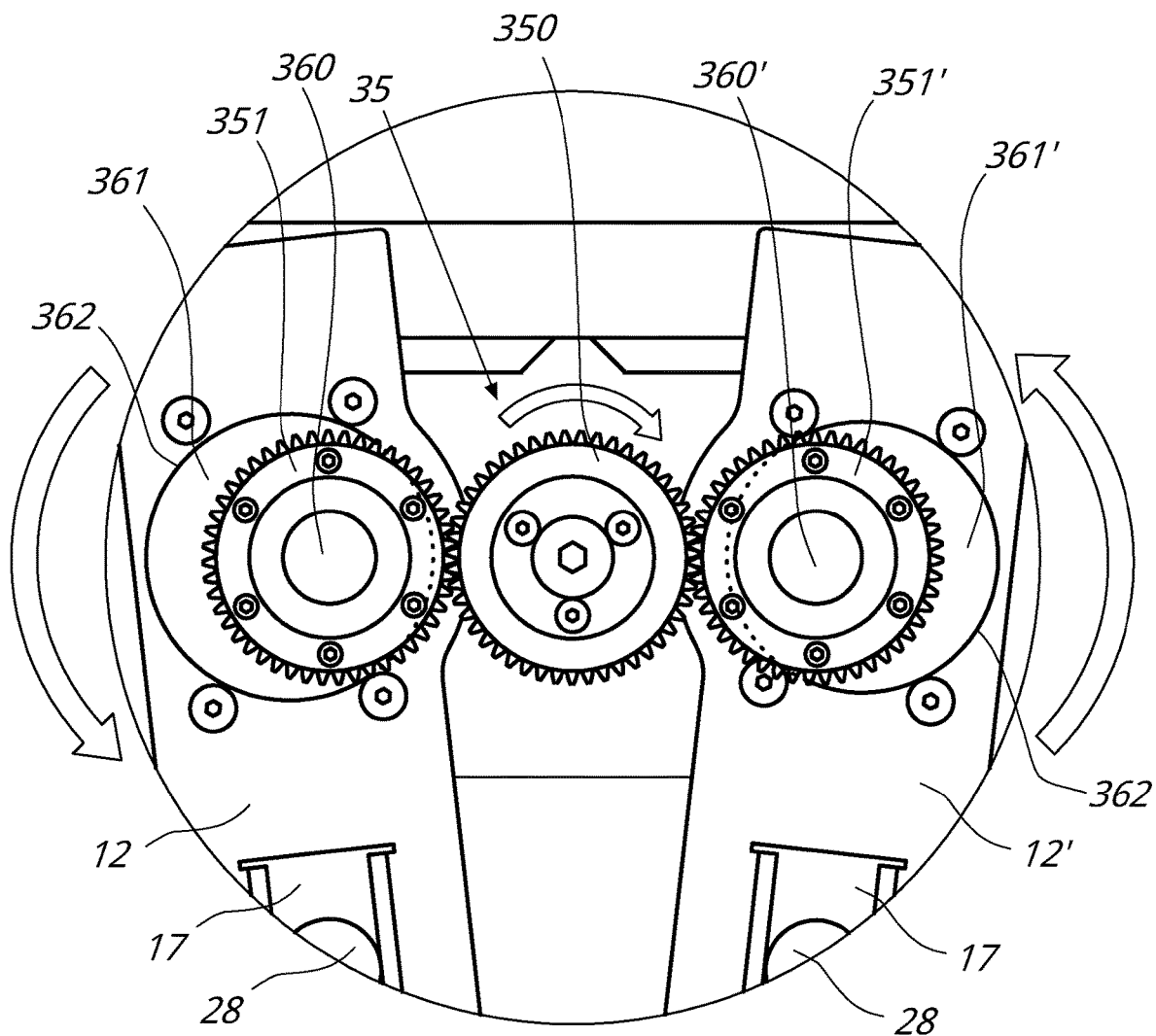
Figure 9:
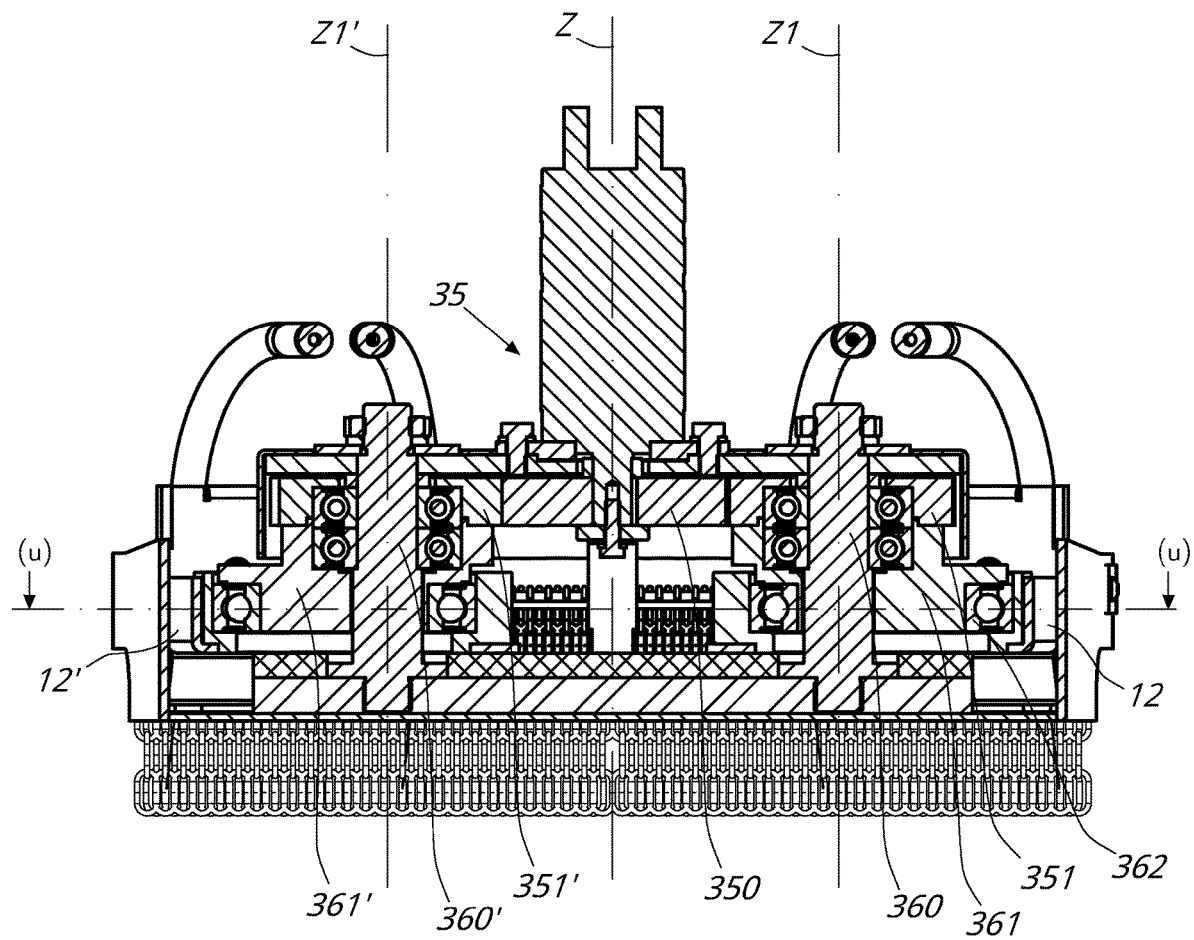
FIG. 9 is a section view of the spraying device 10 of FIG. 7.
Figure 10:
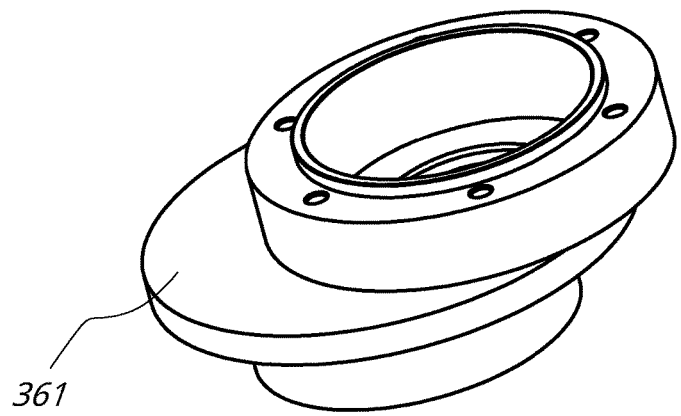

Moreover, the apparatus 1 may include motor means 35 acting upon the support structure 11 to promote the alternative movement of the one or more outlet nozzles 41 between a first end stroke position and a second end stroke position, shown for example in FIGS. 5a and 5c.

The movement of the one or more outlet nozzles 41 may not be circular around the axis of the motor means 35.

Preferably, the motor means 35 may comprise a hydraulic motor having a speed of 300 revolutions/minute to 1500 revolutions/minute.

The first and the second end stroke positions may be reciprocally opposite with respect to a median plane $\pi M$ interposed therebetween.

In other words, regardless of the coupling between the motor means 35 and the support structure 11, the one or more outlet nozzles 41 may oscillate between the two end stroke positions with any trajectory.

Figure 3:
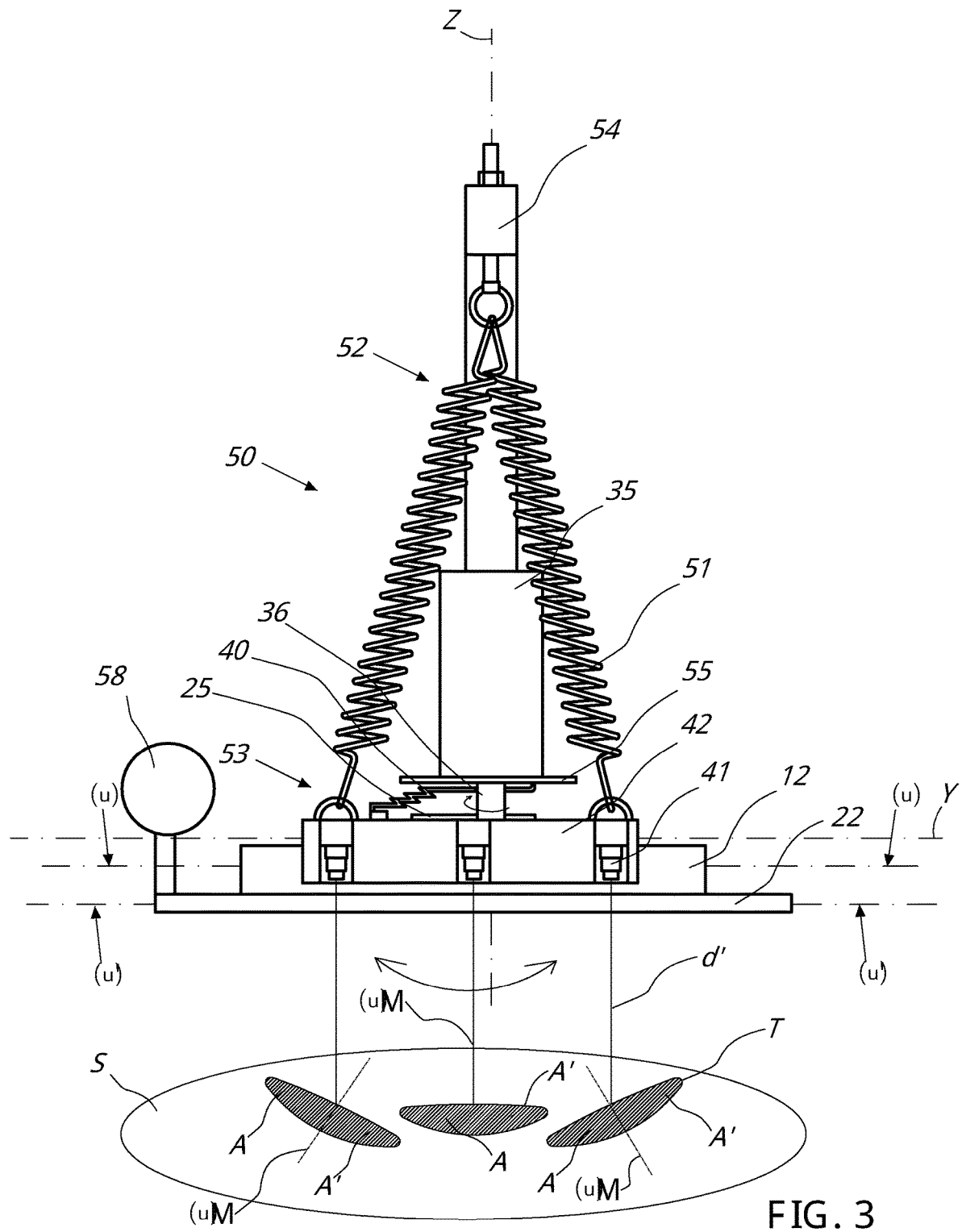
FIG. 3 is a front view of the embodiment of the device 10 of FIG. 2.
Figure 4:
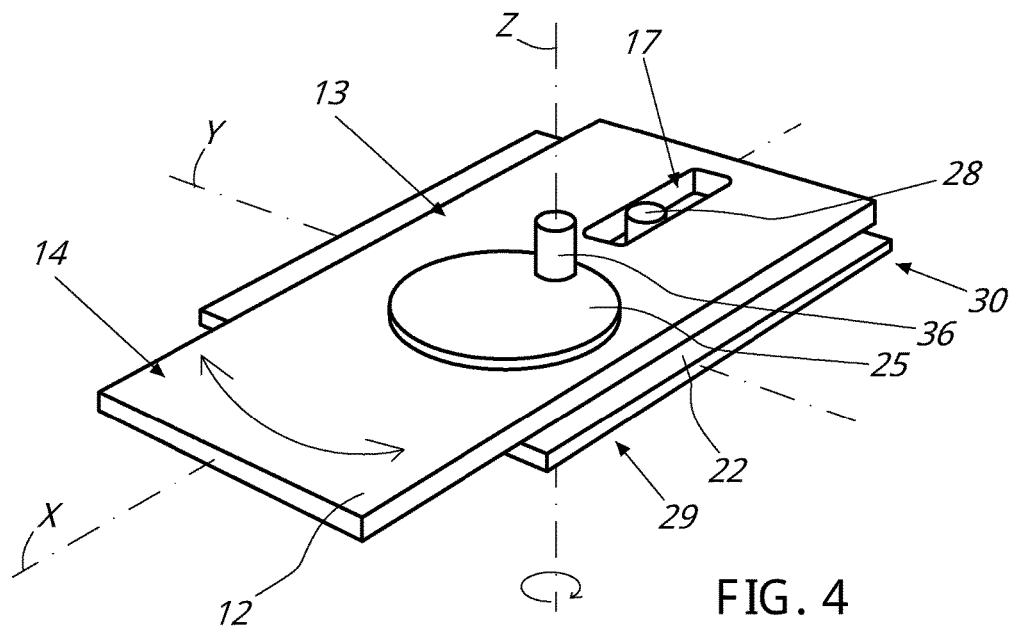
FIG. 4 is an axonometric view of an exploded detail of the embodiment of the device 10 of FIG. 2.

For example, as shown in FIG. 3, the trajectory may be elliptic. On the other hand, as shown in FIG. 6a, the trajectory may be circular. Furthermore, as shown in FIG. 6b, the trajectory may be rectilinear. Preferably, the trajectory T may be curvilinear.

Suitably, the plane passing through the first and second end stroke positions may be substantially parallel to the ground S.

In any case, the alternative movement imparted by the motor means 35 to the one or more outlet nozzles 41 ensures that upon the movement of the device 10 on the ground S along the advancement direction d the jet of the working fluid V flowing from the one or more outlet nozzles 41 hits areas A, A' of the ground S placed on both sides of the median plane $\pi M$.

Advantageously, moreover, the direction of outflow of the one or more outlet nozzles 41 may have the same angle $\alpha$ with respect to the direction d and/or $\beta$ with respect to the axis Z both in the first end stroke position and in the second end stroke position.

In a first preferred but not exclusive embodiment, shown for example in FIGS. 1 to 6b, the support structure 11 may comprise a first plate 12 defining a first plane $\pi$ and a counter-plate 22 defining a second plane $\pi'$ substantially parallel to the first plane $\pi$.

In particular, the latter may be reciprocally superimposed and relative movable to one another in the respective planes. Then, the first plate 12 and the counter-plate 22 may be reciprocally faced and preferably in contact, possibly with the interposition of anti-friction means.

According to a further aspect of the invention, the first plate 12 may be placed above the counter-plate 22 that may, therefore, have a lower face 23 faced to the ground S and an upper face 24 faced to the first plate 12.

On the other hand, the first plate 12 may be placed so as to have a first portion 13 that may be operatively connected to the counter-plate 22 and a second end portion 14 that may protrude with respect to the counter-plate 22 thereof and, therefore, may be faced towards the ground S.

The first plate 12 and the counter-plate 22 may be placed so as they may reciprocally rotate with respect to an axis Z substantially orthogonal to the plane $\pi$.

According to one embodiment, the counter-plate 22 may be fixed, while the first plate 12 may rotate. In particular, the latter may rotate eccentrically with respect to the axis Z.

To the object, a disk 25 movable and operatively connected to the first plate 12 and to the counter-plate 22 may be provided, that may define a plane substantially parallel to the planes $\pi$ and $\pi'$.

According to an aspect of the invention, the axis of the disk 25 may have a predetermined distance from the axis Z, thus defining the eccentricity of the rotation of the disk 25 around the axis Z thereof.

The first plate 12, that may be superimposed on the counter-plate 22, may include a circular slot 15 placed on the first portion 13 having a diameter substantially coincident with the diameter of the disk 25 so as the side edge 27 of the disk 25 is placed in correspondence to the inner edge 16 of the circular slot 15 of the first plate 12. That is, the slot 15 and the disk 25 may be substantially concentric.

Thanks to such a configuration, the eccentric rotation of the disk 25 around the axis Z may correspond to the eccentric movement of the first plate 12 around the axis Z thereof.

According to a further aspect of the invention, one of the first plate 12 and the counter-plate 22 may comprise a longitudinal slot 17 defining an axis X, the other of the first plate 12 and the counter-plate 22 may comprise a pivot 28 that may be substantially parallel to the first axis Z and susceptible to cooperate with the longitudinal slot 17 to slidingly guide the first plate 12 and the counter-plate 22.

In particular, both the axis Z and the axis of the pivot 28 may be perpendicular to the axis X.

When the first plate 12 and the counter-plate 22 are in a rest configuration, the same plate and counter-plate may be reciprocally faced and aligned along the axis X. In particular, the longitudinal slot 17, the axis Z and the axis of the disk 25 may be aligned in this order along the axis X.

The longitudinal slot 17 may have a width substantially equal to the diameter of the pivot 28 so that the latter and the longitudinal slot 17 thereof by reciprocally cooperating may guide the movement of the first plate 12 with respect to the counter-plate 22.

Thanks to such a configuration, the rotation of the disk 25 and the guide imposed by the reciprocal interaction of the longitudinal slot 17 and the pivot 28 may allow the first plate 12 to move with respect to the counter-plate 22 with a movement of elliptical type.

In other words, during the rotation of the disk 25, the former and counter-plate 12, 22 may abandon the rest configuration so that the first plate 12 may perform an elliptic movement with respect to the counter-plate 22 and then it may assume again the rest configuration.

In order to promote such a movement, motor means 35 may be provided acting upon the disk 25 to rotate eccentrically the same disk around the axis Z. In particular, the motor means 35 may consist of a motor shaft of a per se known type integrally coupled to the disk 25, for example by means of a connecting element 36 so that the rotation of the motor shaft promotes the eccentric rotation of the disk 25 thereof and, therefore, of the first plate 12.

Suitably, the device 10 may comprise elastic counter-acting means 50 suitable to counteract the forces, for example of centrifugal type, deriving from the rotation of the first plate 12.

According to an aspect of the invention, the elastic counter-acting means 50 may comprise one or more springs 51 having a first and a second end 52, 53 respectively operatively connected to the former and to the counter-plate 12, 22.

In particular, the springs 51 may be placed so as to promote the return of the former and of the counter-plate towards the rest configuration.

To the object, as shown in the annexed figures, the device 10 may comprise an appendix 54 placed longitudinally parallel to the axis X and above the first plate 12, and it may be rigidly coupled to the counter-plate 22.

Suitably, the springs 51 may, therefore, be coupled to the appendix 54 and to the first plate 12. In particular, the first end 52 of the spring 51 may be coupled to the appendix 54 and the second end 53 of the spring 51 may be coupled to the first plate 12 by means of per se known systems.

According to a further aspect of the invention, the second end 53 of the spring 51 may be coupled to the first plate 12 in a side portion proximal to the edge thereof.

Due to such a feature, the springs 51 may be spatially placed in such a way so as not to occupy the space above the first plate 12.

Figure 2:
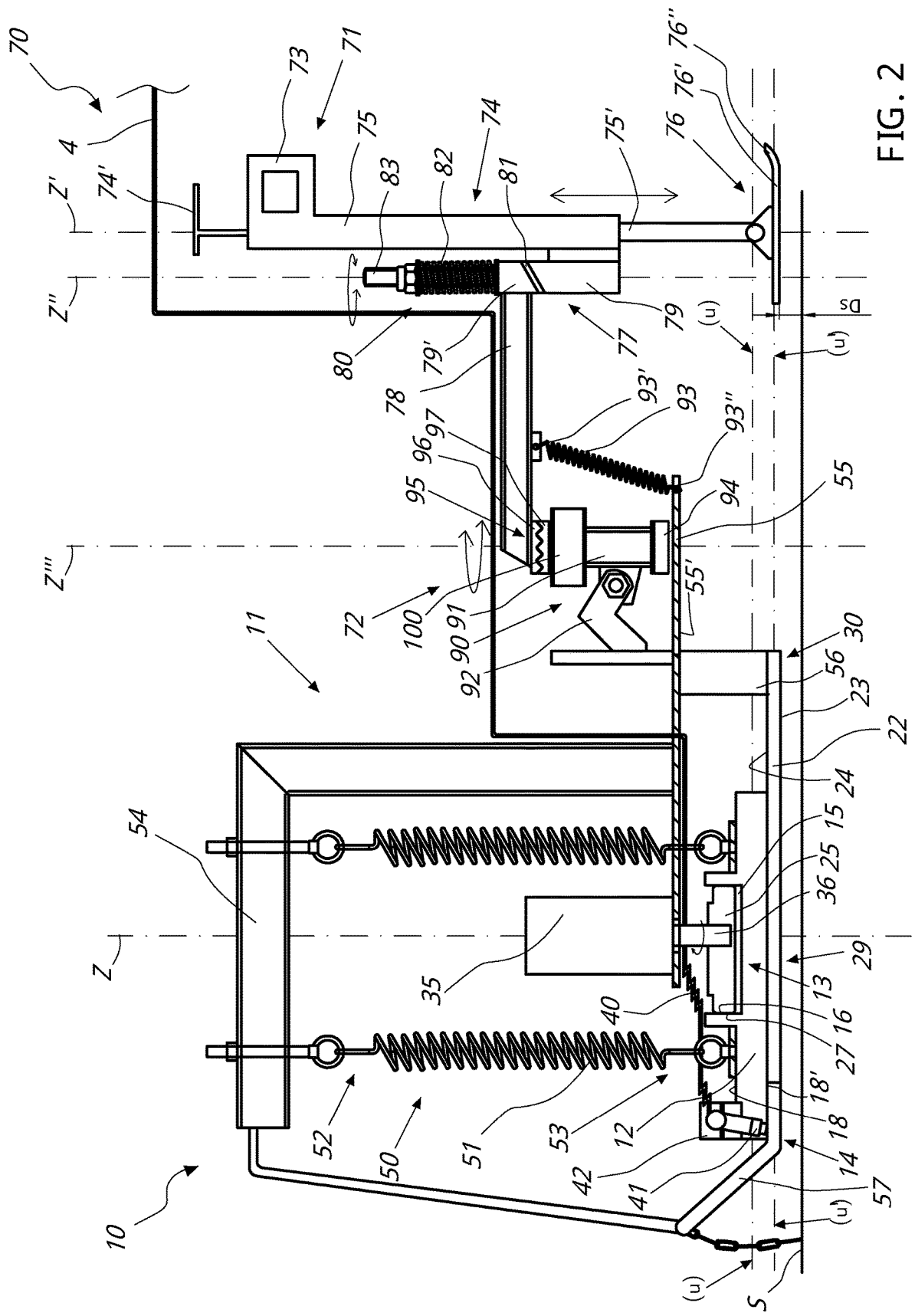
FIG. 2 is a partially sectioned side view of a first embodiment of the spraying device 10.

In this way, as shown in FIGS. 2 and 3, in such a space above the first plate 12 a third plate 55 may be placed. In particular, the third plate 55 may be placed in parallel to the counter-plate 22 and rigidly coupled thereto by means of a suitable rigid connecting element 56.

The counter-plate 22 may comprise a central portion 29 that may be operatively connected to the first plate 12 and an end portion 30 that may be connected to the third plate 55 and may include the rigid connecting element 56.

In this way, as particularly shown in FIG. 2, the third plate 55 and the counter-plate 22 may be superimposed and both may be faced to the first plate 12. In particular, they may be placed so as the lower surface 55' of the third plate 55 and the upper surface 24 of the counter-plate 22 respectively face the upper surface 18 and the lower surface 18' of the first plate 12.

Suitably, both the motor means 35 and the appendix 54 may be rigidly coupled to the third plate 55 so as, therefore, to be integrally coupled also to the counter-plate 22.

Moreover, the device 10 may comprise at least one duct 40 that may include at least one outlet nozzle 41 placed near the end portion 14 of the first plate 12. In particular, the outlet nozzle 41 may be integrally mounted to the end portion 14 to unitarily move therewith.

Suitably, both the nozzle 41 and the duct 40 may be placed on the fluid connecting line 4.

The nozzle 41, that may be a high-pressure nozzle of a per se known type, for example a flat fan nozzle or a full cone nozzle, may be oriented so as to spray the atomized water V towards the ground S so that the jet flowing from the nozzle 41 may interact with the latter.

Since the outlet nozzle 41 may move unitarily with the end portion 14 of the first plate 12, the same outlet nozzle moves according to the above described movement, that is, the nozzle 41 may have an elliptical movement with respect to the support structure 11.

When the device 10 and the ground S are reciprocally stationary, the area A of the ground S interested by the spraying may have a substantially elliptical shape, as better shown in FIGS. 3, 5a, 5b and 5c.

Thanks to such a feature, during the movement along the advancement direction d of the device 10 on the ground S, the jet flowing from the nozzle 41 may hit the latter with a helical path.

In this way, advantageously, the device 10 may move forward with respect to the ground S with a high speed without thereby limiting the effectiveness of the spraying thereon.

According to another aspect of the invention, the nozzle 41 may be placed so that the jet flowing therefrom is substantially perpendicular to the first plate 12.

On the other hand, according to a different embodiment, the jet flowing from the nozzle 41 may assume different inclinations with respect to the first plate 12 so as to spray the ground S with different inclinations.

Suitably, therefore, a manifold 42 may be provided fluidly connected to the duct 40 that may comprise the nozzle 41. In particular, the manifold 42 may be placed near the portion 14 of the first plate 10 and it may move integrally with the latter.

According to an aspect of the invention, the manifold 42 may be placed longitudinally along an axis Y substantially orthogonal to the axes X and Z.

The manifold 42 may be fixed and it may allow the rotation of the nozzle 41 with respect to the axis Y. In particular, the nozzle 41 may be adjustable, that is, the rotation of the nozzle 41 may be performed by the user so as to vary the angle between the jet flowing from the nozzle 41 and the ground S.

On the other hand, according to a different embodiment, the manifold 42 may be rotationally movable around the axis Y in order to allow the variation and possibly the adjustment of the angle of incidence of the jet flowing from the nozzle 41 on the ground S.

Advantageously, the manifold 42 may comprise a plurality of nozzles 41 that may be placed at a predetermined reciprocal distance along the axis Y and oriented towards the ground S so that each one defines an area A of spraying, as shown in FIGS. 5a to 5c.

In this way, it is possible to spray at the same time a large portion of the ground S thus making the device 10 particularly effective.

According to an aspect of the invention, the area A interested by the jet flowing from a nozzle may partially overlap with the area A interested by the jet flowing from the adjacent nozzle.

In other words, the reciprocal distance between the nozzles 41 may be such that during the processing one or more portions of the ground S may be interested by two or more jets flowing from the nozzles 41.

Thanks to such a feature the apparatus 1 may have a particularly effective spraying action. Moreover, it may be possible to further increase the speed along the reciprocal advancement direction d without decreasing the effectiveness of the spraying.

According to another aspect of the invention, the device 10 may comprise protective elements 57, for example protection cases, tubular elements, chains or the like. In this way, it may be possible to use the device 10 in different environments without the risk of damaging it.

In particular, the protective elements 57 may comprise a tubular element 58 placed laterally to the counter-plate 22 so as to act as a guide to the device 10 when the latter is used near to vertical obstacles such as walls, fences or plants. Possibly, the tubular element 58, as particularly shown in FIG. 3, may be rigidly fastened to the counter-plate 22.

In another preferred but not exclusive embodiment, shown for example in FIGS. 7 to 10, the support structure 11 may include a pair of first plates 12, 12' substantially coplanar defining the plane π.

Suitably, each of the first plates 12, 12' may have one or more outlet nozzles 41, 41'.

Preferably, upon the rotation of the motor means 35 around the axis Z the first plates 12, 12' may oscillate in the plane π around respective axes Z1, Z1' substantially parallel to the axis Z. Preferably, the oscillation occurs in phase opposition, so that each of the first plates 12, 12' dampens the vibrations induced by the oscillation of the other plate.

To the object, the motor means 35 may include a driver toothed wheel 350 rotating around the axis Z engaged with respective driven toothed wheels 351, 351' rotating around respective axes Z1, Z1'.

Each of the driven toothed wheels 351, 351' may be fitted on a respective shaft 360, 360' having a respective cam 361, 361' operatively coupled to a respective first plate 12, 12' by means of a circular cam follower 362.

In this way, the rotation of the motor means 35 around the axis Z promotes the eccentric movement of the first plates 12, 12'.

Moreover, each of these latter has a respective longitudinal slot 17 defining a respective axis X, wherein a respective pivot 28 is inserted substantially parallel to the axis Z.

In this way, the pivot 28 slidingly guides the rotation of the first plates 12, 12'.

In this way, the eccentric rotation of the first plates 12, 12' guided by the pivots 28 imparts the elliptical movement to the respective outlet nozzles 41, 41'.

Thanks to the above mentioned features, the spraying device 10 thus configured is highly efficient, and it allows an extremely fast and effective weeding.

Moreover, the chosen mechanical solution allows to minimize the vibrations, as well as to work at a relatively high number of engine revolutions. This allows to perform a highly efficient weeding and/or to move forward along the direction d at a relatively high speed.

Then, by changing the toothed wheels, it is possible to vary the gear ratio between the driver wheel and the driven wheels, so as to vary also the action of the nozzles 41.

According to a particular but not exclusive embodiment, the tractor T and the spraying device 10 may be reciprocally anchored by means of suitable integral connecting means 70, the supply means 5 may be placed on the integral connecting means 70 thereof and the tank 2 may be placed on the support frame 6.

It is understood that the integral connecting means 70 may connect to the tractor T a spraying device 10 of any shape, not necessarily oscillating and/or not necessarily the one shown in the annexed figures, without departing from the scope of protection defined by the appended claims. For example, the integral connecting means 70 may rigidly connect to the tractor T a spraying device 10 that includes a rotor that rotates around the axis Z.

In particular, the integral connecting means 70 may comprise a first portion 71 susceptible to be anchored the tractor T or to the support frame 6 and a second portion 72 susceptible to be anchored to the spraying device 10.

The first portion 71 may comprise a first coupling element 73 that may consist of a hook or of a structure having one or more portions susceptible to be coupled to corresponding portions placed on the tractor T of a per se known type.

For example, the coupling element 73 may comprise a male or female element, and the support frame 6 or the tractor T may comprise a corresponding second coupling element 7, for example a corresponding female or male element susceptible to be reciprocally coupled to the first coupling element 73.

In this way, thanks to the integral connecting means 70 upon the advancement of the tractor T with respect to the ground S also the device 10 may move forward and, therefore, spray the ground S thereof.

The integral connecting means 70 may comprise at least one adjustment foot 74 defining an axis Z that may comprise at least one first tubular element 75 mountable on and/or integral to the tractor or to the similar agricultural machine T and rigidly connected to the spraying device 10, and a second tubular element 75' having a lower portion 76 susceptible to come in contact with the ground S thereof.

In particular, the lower portion 76 may comprise a sliding block 76' to interact with the ground S and not to obstruct the sliding of the apparatus 1 with respect to the latter.

According to a further aspect of the invention, the sliding block 76' may comprise at least one end 76" curved upwards so as to facilitate the sliding on the ground S during the reciprocal advancement of the end thereof and of the apparatus 1.

The first tubular element 75 and the second tubular element 75' may be telescopically coupled to each other so that the reciprocal sliding thereof allows to vary the length of the adjustment foot 74.

According to an aspect of the invention one of the first and the second tubular element 75, 75' may have a male thread and the other of the first and the second tubular element 75, 75' may have a corresponding female thread so as the first and the second tubular element 75, 75' are reciprocally screwable so as to vary the length of the adjustment foot 74.

In order to facilitate such an adjustment operation a lever 74' may be provided graspable by a user acting upon the first or second tubular element 75, 75' to telescopically approach/distance the latter.

Thanks to such a feature, upon the reciprocal approach of the first and the second tubular element 75, 75', the second tubular element 75', and therefore also the sliding block 76', approaches the first element 75 thus increasing the distance Ds between the sliding block 76' thereof and the ground S.

Since the first tubular element 75 may be integrally connected to the spraying device 10, the reciprocal sliding of the first and second tubular element 75, 75' may allow to vary the distance of the spraying device 10 from the ground S.

Suitably, the portion 76 may comprise a hinge of a per se known type so as the sliding block 76' may be rotationally attached to the second tubular element 75' to better adapt to the roughness of the surface S.

In this way, the apparatus 1 may adapt to the roughness of different types of ground.

The adjustment foot 74 may be placed along the advancement direction d, before the device 10, as shown in FIGS. 1 and 2. In this way, advantageously, in case of unexpected obstacles, such as a stone, the adjustment foot 74 may impact thereto and after the impact with the stone it may raise so as to increase the distance Ds between the sliding block 76' and the ground S and, therefore, also between the device 10 and the surface S so that the latter does not impact frontally with the stone along the advancement direction d.

Suitably, the integral connecting means 70 may further comprise a first rotating joint 77.

According to an aspect of the invention, the joint 77 may be interposed between the first tubular element 75 and the spraying device 10 to allow the reciprocal rotation thereof with respect to an axis Z" substantially parallel to the axis Z'.

The first rotating joint 77 may have a first portion 79 integrally connected to the first tubular element 75 and a second portion 79' integrally connected to the spraying device 10. In particular, the first and the second portion 79, 79' may be rotating around a Z" substantially parallel to the axis Z' between a working position and a position wherein the second portion 79' is rotated with respect to the first portion 79.

Since the device 10 is integral with the second portion 79', when the latter is in the working position, also the device 10 is in the working position, and when the same portion is in the rotated position also the device 10 is in the rotated position.

Thanks to such a feature, during the advancement along the advancement direction d, the device 10 and the adjustment foot 74 may be susceptible to reciprocally rotate around the axis Z" and, therefore, in a plane substantially parallel to the ground S so that the device 10 may hit a greater area of interest S thereof and may be particularly effective.

Furthermore, during the use of the apparatus 1, the device 10 may impact with one or more vertical obstacles, for example in case it is used in a farmland, in an orchard, or in vineyards and/or rows. Thanks to the joint 77, the device 10 may rotate after the lateral impact with such obstacles so as not to damage neither the rows nor the device thereof.

Suitably, the first rotating joint 77 may further comprise first restore means 80 acting upon the second portion 79' to counteract the rotation thereof and to return the same portion from the rotated position to the working position and therefore, to promote the return of the spraying device 10 from the rotated position to the working position.

The restore means 80 suitable to dampen the rotation may be of a per se known type. For example, they may comprise cam means 81 acting upon the second portion 79' so as the rotation of the latter around the axis Z" corresponds to the sliding thereof along the axis Z" thereof and vice versa.

Moreover, first elastic counter-acting means 82 may be provided, for example a spring, acting upon the second portion 79' to dampen the sliding along the axis Z" and to force the return thereof from the rotated position to the rest position.

In particular, when the device 10 rotates because of the presence of the obstacle passing from the working position to the rotated position, the spring 82 may, therefore, act as a damping element, and when the device 10 remains free in the rotated position, the spring 82 may act as a restore element to promote the return of the device 10 in the rest position.

According to a particular aspect of the invention, the restore means 80 may be adjustable by a user so as to vary the intensity of the action of the restore means 80 thereof. In particular, a suitable knob 83 may be provided graspable by the user to allow to vary the pre-loading of the spring 82.

In this way, the device 10 may impact against a particularly fragile vertical obstacle, for example the trunk of a plant of a row, and it may rotate with respect to the tractor T so as not to damage the plant thereof until reaching the rotated position, and subsequently, thanks to the action of the restore means 80, it may return in the working position once the vertical obstacle is no longer present.

Moreover, advantageously, thanks to the restore means 80, the device 10 may always be in contact with the vertical obstacle so as not to leave unworked portions of the surface S, for example those next to the obstacle thereof.

According to a further aspect of the invention, the integral connecting means 70 may comprise a second rotating joint 90 having a first portion 91 integrally connected or connectable to the tractor or to the similar agricultural machine T and a second portion 92 integrally connected to the spraying device 10.

Such a joint 90 may be of a per se known type. In particular, the first and second portions 91, 92 may be rotating around an axis Y' substantially perpendicular to the axis Z and to the axis X between a working position and a position wherein the second portion 92 is rotated with respect to the first portion 91.

For example, in correspondence to the working position the device 10 may be substantially parallel to the ground S and in correspondence to the rotated position the device 10 may be in a position rotated with respect to the ground S.

Thanks to such a feature, the device 10 for example after the impact with a stone or an obstacle may raise, thus avoiding damaging the integral connecting means 70.

According to an aspect of the invention, the second joint 90 may be placed between the first joint 77 and the device 10. In particular, the first portion 91 may be integrally connected to the first joint 77, for example by means of a longitudinal tubular element 78.

Suitably, second restore means 93 may be provided cooperating with the second rotating joint 90 and acting upon the spraying device 10 to counteract the rotation and to return the same spraying device 10 from the rotated position to the working position. In particular, the latter 93 may consist for example of elastic counter-acting elements, for example a spring, suitable to counteract the rotation of the second portion 92 and to promote the return thereof 92 from the rotated position to the working position.

According to a particular aspect of the invention, the spring 93 may have a first end 93' attached to the integral connecting means 70 and the opposite end 93" attached to the device 10. In particular, as shown in FIG. 2, the first end 93' may be attached to the longitudinal tubular element 78 and the opposite end 93" may be attached to the third plate 55 of the device 10.

The second rotating joint 90 may comprise a lower surface 94 susceptible to come in contact with the third plate 55, the latter is susceptible to act as abutment to the former In particular, the lower surface 94 and the third plate 55 may reciprocally abut when the second portion 92 of the joint 90 is in the working position and they may be reciprocally distal when the same portion 92 is in the rotated position.

According to a further aspect of the invention, the integral connecting means 70 may comprise an adjusting element 95 rotating around an axis Z''' substantially parallel to the axis Z to allow the rotation of the spraying device 10 in a plane substantially parallel to the ground S.

The adjusting element 95 may be interposed between the first joint 77 and the second joint 90 to integrally reciprocally couple the latter.

In particular, the adjusting element 95 may be blockable in a plurality of angular positions so as to allow the adjustment of the angular position of the spraying device 10 with respect to the tractor T in a plane substantially parallel to the area to be weeded S.

To the object, the adjusting element 95 may for example comprise an upper element 96 and a lower element 97, that may be suitably reciprocally shaped so as the latter 96, 97 may be movable between a distal position wherein they allow the reciprocal rotation between the joint 77 and the spraying device 10 and a fastening position wherein the same upper and lower elements 96, 97 are integrally fastened.

Advantageously, the shape may be such as to allow a plurality of angular fastening positions so as to integrally fasten the joint 77 and the spraying device 10 in different angular positions depending on the needs of the user.

For example, one of the upper element 96 and the lower element 97 may comprise one or more projections and the other of the upper element 96 and the lower element 97 may comprise corresponding counter-shaped seats, or vice versa.

Thanks to this feature, when the upper element 96 and the lower element 97 are in the distal position also the projection and the counter-shaped seat may be in a reciprocally distal position so as to allow the reciprocal rotation thereof and when the upper element 96 and the lower element 97 are in the proximal position also the projection and the counter-contact seat may be in reciprocal contact so as to integrally fasten the upper element 96 and the lower element 97.

According to a further aspect of the invention, the integral connecting means 70 may further comprise a damping element 100 suitable to dampen the vibrations coming from the spraying device 10, such as a rubber bushing 100 that may be of a per se known type and it may comprise for example a polymeric element.

The damping element 100 may be interposed between the device 10 and the foot 74 so as to interrupt the continuity thereof and to dampen the vibrations thereof.

According to an aspect of the invention, the rubber bushing 100 may be interposed between the adjusting element 95 and the second joint 90 or possibly it may be placed near the adjusting element 95 thereof and possibly integrally coupled to the latter.

Operationally, the apparatus 1 may be anchored to an agricultural machine that moves forward along the advancement direction d. Thanks to the integral connecting means 70 upon the advancement of the tractor T, also the device 10 moves forward along the same direction d so as the nozzles 41 may spray towards the ground S.

In particular, thanks to the action of the motor means 35 and to the above described configuration, the first plate 12 moves with elliptical motion.

Upon the advancement of the tractor T the nozzles 41 placed on the plate 12 hit the ground S with helical path so as to hit a greater portion of the surface S thereof.

From the above description, it is evident that the invention fulfils the intended objects.

The invention is susceptible of numerous modifications and variations. All the details may be replaced with other technically equivalent elements, and the materials may be different according to requirements, without departing from the scope of protection of the invention defined by the appended claims.

The invention claimed is:

1. An apparatus for the weeding of a ground to be used with a tractor adapted to move forward on the ground along an advancement direction, the apparatus comprising:
   a tank for a working fluid;
   a high-pressure pump adapted to pump the working fluid at a working pressure of at least 400 bar;
   a spraying device for spraying the working fluid on the ground;
   a fluid connecting line for connecting the tank and the spraying device passing through the high-pressure pump;
   wherein the tank, the high-pressure pump and the spraying device comprise connecting members for connecting to the tractor;
   wherein the spraying device comprises:
   a support structure including a first plate defining a first plane;
   an outlet nozzle mounted on the first plate, the outlet nozzle having a direction of outflow which is transverse with respect to the first plane so as to be oriented towards the ground during use; and
   a motor acting upon the first plate to move the outlet nozzle in an oscillating manner around a first axis perpendicular to the first plane and perpendicular to the advancement direction of the tractor.

2. Apparatus according to claim 1, wherein the support structure comprises an adjustment foot defining a second axis parallel to the first axis, the adjustment foot comprising a first tubular element mountable on or integral to the tractor and rigidly connected to the spraying device.

3. Apparatus according to claim 2, wherein the adjustment foot further comprises a second tubular element having a lower portion adapted to interact with the ground to follow the dips thereof, the first tubular element and the second tubular element being telescopically coupled so that the reciprocal sliding thereof allows to vary the distance of the spraying device from the ground.

4. Apparatus according to claim 3, wherein the support structure further comprises a first rotating joint having a first portion integrally connected to the first tubular element and a second portion integrally connected to the spraying device, the first and second portions being rotating around a third axis parallel to the second axis between a working position and a position wherein the second portion is rotated with respect to the first portion, the first rotating joint further comprising a first restore member acting upon the second portion to counteract the rotation thereof and to return the same second portion from the rotated position to the working position.

5. Apparatus according to claim 4, wherein the first restore means comprise a cam acting upon the second portion so as the rotation of the latter around the third axis corresponds to the sliding thereof along the third axis and vice-versa, the first restore member further comprising a first elastic counter-acting element acting upon the second portion to dampen the sliding thereof along the third axis and to force the return thereof from the rotated position to the rest position.

6. Apparatus according to claim 1, wherein the support structure further comprises an adjustment element rotating around a fourth axis parallel to the first axis to allow the rotation of the spraying device in a plane parallel to the ground, the adjustment element including a system for the selective blocking thereof in a plurality of angular positions so as to allow the adjustment of the angular position of the spraying device.

7. Apparatus according to claim 1, wherein the motor acts upon the first plate to promote an alternate oscillating movement around the first axis of the outlet nozzle between a first end-stroke position and a second end-stroke position reciprocally opposite with respect to a median plane interposed therebetween perpendicular to the first plane.

8. Apparatus according to claim 1, wherein the first and second end-stroke positions lie on a curvilinear trajectory.

9. Apparatus according to claim 1, wherein the outlet nozzle is mounted movable on the first plate to allow the selective variation of the inclination of the direction of outflow of the outlet nozzle.

10. Apparatus according to claim 1, wherein the support structure, the first plate and the motor are reciprocally coupled in such a way that the action of the motor on the first plate promotes the elliptical movement of the outlet nozzle between the first and second end-stroke positions, so that upon the advancement of the tractor along the advancement direction the outflow from the outlet nozzle hits the ground with a helical path.

11. Apparatus according to claim 10, wherein the support structure comprises a plurality of nozzles placed at a reciprocal distance such that the areas of the ground hit by each of them are contiguous or partially overlapped therebetween to each other.

12. Apparatus according to claim 10, wherein the motor means acts upon the first plate to promote the eccentric movement thereof around the first axis, the support structure guiding the first plate slidably along a sixth axis so that the eccentric rotation of the first plate guided by the support structure imparts the elliptical movement to each of the outlet nozzles.

13. Apparatus according to claim 12, wherein one of the first plate and the support structure comprises a longitudinal slot defining the sixth axis perpendicular to the first axis, the other of the first plate and the support structure comprising a pivot parallel to the first axis inserted through the longitudinal slot.

14. Apparatus according to claim 12, wherein the support structure further comprises an elastic counter-acting member operatively connected to the first plate to counteract any centrifugal forces due to the action of the motor.

15. Apparatus according to claim 12, wherein the support structure includes a support counter-plate defining a second plane parallel to the first plane defining a support rotating plane for the first plate, the latter and the counter-plate being reciprocally overlapped and movable to one another, the first plate comprising the longitudinal slot, the counter-plate comprising the pivot.

16. Apparatus according to claim 12, wherein the support structure includes a pair of first plates coplanar defining the first plane, each of the first plates having respective one or more outlet nozzles, the support structure, the first plates and the motor being reciprocally coupled in such a way that the action of the latter motor on the first plates promotes the elliptical movement of the respective nozzles.

17. Apparatus according to claim 16, wherein the first plates and the motor are operatively coupled to each other so that the rotation of the latter around the first axis promotes the oscillation of the former in the first plane around respective seventh axes parallel to the first axis in phase opposition.

18. Apparatus according to claim 17, wherein the motor means include a driver toothed wheel rotating around the first axis operatively coupled to respective driven toothed wheels rotating around the respective seventh axes, each of the driven toothed wheels being fitted on a respective shaft having a respective cam operatively coupled to the respective first plate so that the rotation of the motor around the first axis promotes the eccentric movement of the first plates, each of the latter being slidably guided along a respective sixth axis so that the eccentric rotation of the first plates guided by the support structure imparts the elliptical movement to the respective outlet nozzles.

19. Apparatus according to claim 18, wherein for each of the first plates one of the first plate and the support structure includes the longitudinal slot defining the respective sixth axis, the other of the first plate and the support structure comprising the pivot.

20. An apparatus for the weeding of a ground to be used with a tractor adapted to move forward on the ground along an advancement direction, the apparatus comprising:

a tank for a working fluid;

a high-pressure pump adapted to pump the working fluid at a working pressure of at least 400 bar;

a spraying device for spraying the working fluid on the ground;

a fluid connecting line for connecting the tank and the spraying device passing through the high-pressure pump;

wherein the tank, the high-pressure pump and the spraying device comprise connecting members for connecting to the tractor;

wherein the spraying device comprises:

a support structure including a first plate defining a first plane;

an outlet nozzle mounted on the first plate, the outlet nozzle having a direction of outflow which is transverse with respect to the first plane so as to be oriented towards the ground during use; and a motor acting upon the first plate to move the outlet nozzle in a rotating manner around a first axis perpendicular to the first plane and perpendicular to the advancement direction of the tractor.

* * * * *